C. K. SALISBURY.
MILKING MACHINE.
APPLICATION FILED AUG. 27, 1917.
1,306,634.
Patented June 10, 1919.
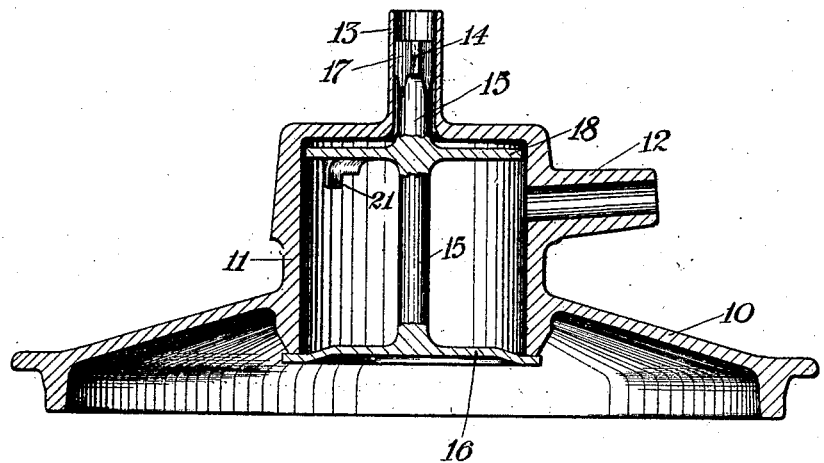
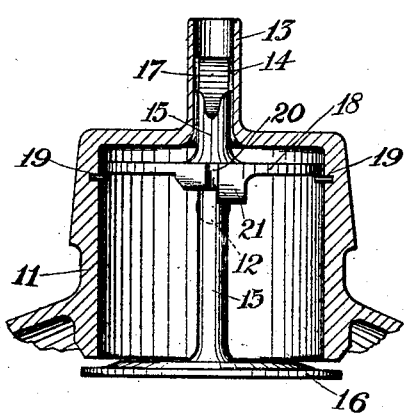
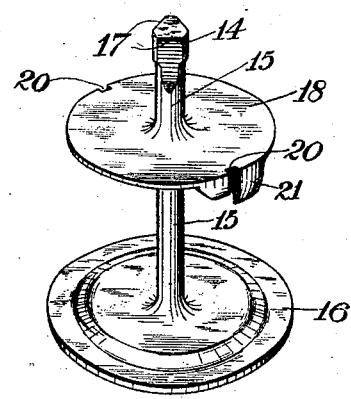
WITNESSES.
INVENTOR
Charles K. Salisbury.
By R. S. Caldwell
ATTORNEY.

UNITED STATES PATENT OFFICE.

CHARLES K. SALISBURY, OF MILWAUKEE, WISCONSIN, ASSIGNOR OF ONE-HALF TO GEORGE BARBER AND ONE-HALF TO JOSEPHINE A. HARBAUGH, BOTH OF MILWAUKEE, WISCONSIN.

MILKING-MACHINE.

1,306,634.  Specification of Letters Patent.  Patented June 10, 1919.

Application filed August 27, 1917. Serial No. 188,457.

*To all whom it may concern:*

Be it known that I, CHARLES K. SALISBURY, a citizen of the United States, and resident of Milwaukee, in the county of Milwaukee and State of Wisconsin, have invented new and useful Improvements in Milking-Machines, of which the following is a description, reference being had to the accompanying drawings, which are a part of this specification.

This invention relates to milking machines of the type in which a milk chamber connected with a pump and also with teat connections serves to hold the milk drawn from the cow during the suction stroke of the pump by means of a valve which opens under the weight of the milk during the return stroke of the pump to discharge the milk into a receptacle therebeneath.

An object of the invention is to utilize the milk chamber as a cylinder for a plunger carrying the valve member whereby the suction from the pump operates upon said plunger to close the valve member irrespective of any influence it may have upon the valve member itself.

Another object of the invention is to provide a guide for centering the valve member and its plunger in a structure of this type.

Another object of the invention is to so position the plunger between the air connection and the milk connection that it effectively prevents the milk foam being drawn into the air connection.

Another object of this invention is to provide stop means for limiting the opening of the valve member to a position that will permit of a free discharge of the milk and from which it may be quickly moved to its closed position by the influence of the suction on the plunger.

Another object of this invention is to provide for readily disconnecting the valve and its plunger so that they may be removed from the milk chamber for cleaning.

With the above and other objects in view, the invention consists in the milking machine as herein claimed and all equivalents.

Referring to the accompanying drawings in which the same characters of reference indicate like parts in the different views:

Figure 1 is a central vertical sectional view of a milking machine constructed in accordance with this invention;

Fig. 2 is a similar view on a plane at right angles to the sectional plane of Fig. 1; and Fig. 3 is a perspective view of the valve member with its plunger and guide.

In these drawings 10 indicates a milk pail cover, preferably of cast aluminum, and also preferably having formed in the same casting therewith an inverted-cup-shaped milk chamber 11 with a teat cup connection 12 at its side and a pump connection 13 at its top. The milk pail, the air pump and its tube, and the teat cups and their tubes are not shown as these parts are well understood in the art. These connections are in the form of projecting nipples to receive rubber tubes as usual. The pump connection 13 is concentric with the cylindrical milk chamber, and slidably fitting therein with an easy working fit is the enlargement or head portion 14 of the stem 15 of a valve member 16 which seats on the lower edge of the milk chamber. The head 14 of the valve stem constitutes a guide for the valve, but flat faces 17 formed therein permit the free passage of air to and from the milk chamber during the successive strokes of the pump.

On the valve stem 15 is a plunger 18 working within the cylinder formed by the milk chamber, and so located on the valve stem as to be close to the top of the milk chamber when the valve is seated, and above the milk inlet 12. There is sufficient clearance between the plunger and the walls of the milk chamber to permit of the passage of air for communicating the necessary suction to the teat cups and still the fit of the plunger in the cylinder is sufficiently close to cause it to be influenced by the suction from the pump so that it is lifted to close the valve 16.

The valve 16 and its stem 15 and the plunger 18 preferably form a single aluminum casting so that the entire device consists of these two parts; the cover casting with its milk chamber and the valve casting with its plunger and guide.

In order to confine the valve member and its parts in their operative relation to the milk chamber, and in order to determine the open position of the valve, pins 19 are embedded in the walls of the milk chamber at diametrically opposite points and project into the milk chamber sufficiently to be engaged by the plunger 18, as seen in Fig. 2, thus causing the valve to be suspended in an open position, allowing free outlet for the milk in the milk chamber. In order that the plunger 18 should pass these projecting pins 19 in connecting or disconnecting the valve from the milk chamber, said plunger 18 is provided with notches 20 in its edges to register with the pins. Without suitable guard means notches 20 might come into register with the pins during the operation of the valve and permit the valve to fall. The guard means to prevent this consists of stepped lugs 21 on the bottom of the plunger 18 and positioned so that the notches 20 pass through them. The stepped formation of the lugs 21 provides a shorter portion which will just clear the pins 19 when the valve is against its seat, and a longer portion which will not clear them. The notches 20 are so located that when the valve member is held against its seat and turned so that the shorter portions of the lugs clear the pins 19, the longer portions of the lugs 21 will strike the pins 19, when the pins register with such notches. The lugs 21 are beveled at the shorter end thereof, so that, if there is a tendency for the valve member to turn during its operation, it will not become engaged upon the pins 19 while in a closed position, but the inclined portions of the lugs 21 resting on the pins will cause the valve to turn so as to move the notches away from the pins.

To secure the valve member in place in the milk chamber, it is only necessary to enter it therein until the plunger bears against the pins 19. Then by turning it until the notches register with the pins it may be moved inwardly beyond the pins and then turned so that the lugs 21 move away from the pins and it is in position for operation. To remove the valve it is held on its seat and then turned in the direction to carry the shorter portions of the lugs 21 over the pins 19 and until the longer portions of said lugs strike the pins, whereupon the pins register with the notches and the valve is free to drop out.

The spool-shaped valve member with its guide projection fitting in the air tube possesses the most desirable characteristics for a device of this character. The valve is capable of moving without restraint to find its seat and to fit tightly thereon. It is permitted to open to an extent which will allow the rapid flow of milk from the milk chamber, for the valve is independent of the action of suction upon it for accomplishing its closing movement, the plunger serving the purpose of a motor for lifting the valve and having no greater clearance in the open position of the valve than in the closed position thereof. The guide 14 fitting in the bore of the air connection tube also serves to assist the plunger in lifting the valve, for it occupies a considerable portion of the sectional area of the opening and will be somewhat influenced by the passage of air therethrough. Its principal function, however, it to guide the valve and the plunger and keep them concentric with the milk chamber.

The integral spool-like valve member and the integral milk chamber and pail cover have no joints for accumulating dirt and are easily kept clean and in a sanitary condition. The valve, being independent of the suction upon it for its closing movement, is operated earlier in the stroke of the pump piston and consequently the suction connection through the milk chamber to the teat cups is maintained throughout a longer portion of the stroke of the pump plunger with a consequent increase in efficiency. It also closes under a lighter degree of suction than when the valve alone is depended upon for responding to the suction to close it, and it therefore closes gently and quietly instead of slamming shut and communicating a sudden impulse of strong suction to the teat cups, to the annoyance and perhaps injury of the cow.

It is obvious that various changes may be made in the construction and arrangement of parts shown and described without departing from the spirit and scope of the invention. I therefore desire it to be understood that this invention is not limited to any specific form or arrangement of parts except in so far as such limitations are specified in the claims.

What I claim as new and desire to secure by Letters Patent is:

1. A milking machine comprising a milk chamber having a pump connection at its upper end and a teat cup connection at its side, and a valve seated on the lower end of the milk chamber and having a plunger working in the milk chamber between the pump connection and the teat cup connection and having the same amount of clearance from the walls of the milk chamber in all operative positions thereof.

2. A milking machine comprising a cylindrical milk chamber, a pump connection at its upper end concentric therewith, a teat cup connection at the side of the milk chamber, a valve seat on the lower end of the milk chamber, a stem on the valve working in the bore of the pump connection, and a plunger on the stem working in the upper end of the cylinder between the pump connection and the teat cup connection.

3. A milking machine comprising a milk chamber having a pump connection and a teat cup connection, a spool-shaped valve member with one disk larger than the other and seated on the end of the milk chamber while the smaller disk works with uniform clearance within the milk chamber sensitive to suction therein for closing the valve.

4. A milking machine comprising a milk chamber subject to suction impulses, a valve for closing the milk chamber, and a plunger on the valve working in the milk chamber with uniform clearance therefrom for closing the valve under the influence of the suction impulses.

5. A milking machine comprising an inverted-cup-shaped milk chamber provided with a pump connection and a teat cup connection, and a spool-shaped valve member with one disk portion larger than the other and seated on the open lower end of the milk chamber and with the smaller disk working within the milk chamber with uniform clearance from the side walls thereof.

6. A milking machine comprising an inverted-cup-shaped milk chamber having a pump connection and a teat cup connection, a spool-shaped valve member with one end of larger diameter than the other and seated on the open lower end of the milk chamber and with the other end working within the milk chamber as a plunger, and a guide for centering the valve member within the milk chamber.

7. A milking machine comprising an inverted-cup-shaped milk chamber having a pump connection and a teat cup connection, a spool-shaped valve member with one end larger than the other and seated on the open lower end of the milk chamber and with the other end working within the milk chamber as a plunger, and a projection on the valve member working within the pump connection as a guide for the valve member.

8. A milking machine comprising an inverted-cup-shaped milk chamber having a concentric pump connection and at its side a teat cup connection, a spool-shaped valve member with one end of larger diameter seated on the open lower end of the milk chamber and the other end working as a plunger within the milk chamber, and a projection on the valve member working as a guide within the pump connection, there being free passage around the projection to maintain communication between the pump connection and the milk chamber.

9. A milking machine comprising an inverted-cup-shaped milk chamber having a pump connection and a teat cup connection, a spool-shaped valve member with one end working within the milk chamber as a plunger and the other end seated on the open end of the milk chamber, and means for detachably holding the valve member within the milk chamber.

10. A milking machine comprising an inverted-cup-shaped milk chamber having a pump connection and a teat cup connection, a spool-shaped valve member with one end working as a plunger within the milk chamber and the other end seated on the open end of the milk chamber, and pins projecting within the milk chamber from the side walls thereof and adapted to engage the plunger portion of the valve member to support the valve member.

11. A milking machine comprising an inverted-cup-shaped milk chamber having a pump connection and a teat cup connection, a spool-shaped valve member with one end working as a plunger within the milk chamber and the other end seated on the open lower end of the milk chamber there being notches in the edges of the plunger portion of the valve member, and pins projecting within the milk chamber from the side walls thereof to engage said plunger portion of the valve member, such notches being adapted to register with the pins for the removal of the valve member.

12. A milking machine comprising an inverted-cup-shaped milk chamber having a pump connection and a teat cup connection, a spool-shaped valve member with one end working as a plunger in the milk chamber and the other end seated on the open lower end of the milk chamber, pins projecting within the milk chamber from the side walls thereof and engaging the plunger portion of the valve member to support it, and stepped lugs on the edges of the plunger portion of the valve member having notches therethrough to permit of the passage of the pins for the removal of the valve member.

13. A milking machine comprising an inverted-cup-shaped milk chamber having a concentric pump connection and at its side a teat cup connection, a spool-shaped valve member with its lower end of larger diameter seated on the open end of the milk chamber and its upper end working as a plunger within the milk chamber between the pump connection and the teat cup connection, a projection on the valve member working as a guide in the pump connection, pins projecting within the milk chamber and supporting the plunger portion of the valve member, and beveled stepped lugs on the edges of the plunger portion of the valve member having notches therethrough to permit of the passage of the pins for removing the valve member.

In testimony whereof, I affix my signature, in presence of two witnesses.

CHARLES K. SALISBURY.

Witnesses:
R. S. C. CALDWELL,
C. L. WAAL.